United States Patent
Luo et al.

(10) Patent No.: US 7,800,737 B2
(45) Date of Patent: Sep. 21, 2010

(54) LASER RANGE FINDING DEVICE AND DISTANCE MEASUREMENT METHOD THEREOF

(75) Inventors: Yin-Long Luo, Hang-Zhou (CN); Sheng Liang, Hang-Zhou (CN); Peng-Fei Song, Hang-Zhou (CN); Pie-Yau Chien, Taichung Hsien (TW); Hua-Tang Liu, Taichung Hsien (TW)

(73) Assignee: Asia Optical Co., Inc., Taichung (TW)

( * ) Notice: Subject to any disclaimer, the term of this patent is extended or adjusted under 35 U.S.C. 154(b) by 337 days.

(21) Appl. No.: 12/047,350

(22) Filed: Mar. 13, 2008

(65) Prior Publication Data

US 2008/0316464 A1 Dec. 25, 2008

(30) Foreign Application Priority Data

Jun. 25, 2007 (TW) .............................. 96122879 A (51) Int. Cl.
*G01C 3/08* (2006.01)
(52) U.S. Cl. ........................ 356/5.01; 356/5.1; 356/5.15
(58) Field of Classification Search ................. 356/5.01
See application file for complete search history.

(56) References Cited

U.S. PATENT DOCUMENTS

| 5,691,808 | A   | * | 11/1997 | Nourrcier et al. | ........... 356/5.01 |
| 2003/0035097 | A1 | * | 2/2003 | Lai et al. | ................... 356/5.01 |
| 2005/0036135 | A1 | * | 2/2005 | Earthman et al. | ........ 356/237.1 |
| 2005/0225744 | A1 | * | 10/2005 | Samukawa et al. | ............ 356/28 |

* cited by examiner

*Primary Examiner*—Thomas H Tarcza
*Assistant Examiner*—Luke D Ratcliffe
(74) *Attorney, Agent, or Firm*—Thomas, Kayden, Horstemeyer & Risley (57) ABSTRACT

A distance measurement method for use in a laser range finding device to measure a distance between the laser range finding device and a target is disclosed. The method comprises the following steps. A laser signal is sent to the target in a first time point. A reflected laser signal reflected by the target is then received. A digital signal having a plurality of signal values ranging from 0 to N is obtained by sampling the reflected laser signal with a sampling signal, wherein N is an integer larger than two. A maximum signal value among the signal values is obtained. The distance is calculated according to the first time point and a second time point where the maximum signal value is generated.

16 Claims, 7 Drawing Sheets

| Average value Av | Threshold |
|---|---|
| 18000~19000 | 42 |
| 19001~19500 | 53 |
| 19501~20000 | 62 |
| 20001~20500 | 70 |
| ... | ... |

LASER RANGE FINDING DEVICE AND DISTANCE MEASUREMENT METHOD THEREOF

BACKGROUND OF THE INVENTION

1. Field of the Invention

The invention relates to a laser range finding device and distance measurement method thereof, and more precisely, to a laser range finding device and distance measurement method for measuring a distance between a laser range finding device and a target using time of flight (TOF) of laser signals.

2. Description of the Related Art

Generally, distance measurement methods using laser signals can be classified into three types: phase, interference and pulse feedback types. For a laser range measurement with a pulse type, a distance between a laser range finding device and a target is calculated by directly measuring time of flight of the laser light pulse signal. When a laser diode is trigged by a driving circuit, it generates a start pulse as a starting signal of a time distance measurement system to start counting time. Then, after a reflected laser signal has been received and amplified, the laser diode generates a stop pulse to stop the time count. A counting circuit measures a time difference between the start pulse and the stop pulse to calculate and obtain a time of flight of the transmitted laser pulse signal from the target to the laser range finding device, thereby obtaining the distance between the laser range finding device and the target using the calculated time of flight.

However, when performing a long distance measurement (i.e., the target is far away from the laser range finding device), the signal strength of the reflected signal received by the laser range finding device may be very weak, such that the signal strength of the received signal is only a little larger than that of a noise signal. In this case, noise signal values may be erroneous determined as the target signal if a predetermined threshold level is set too small or the weak signal reflected from the target will not be detected if the predetermined threshold level is set too large.

It is therefore desired to provide methods and apparatuses for improving the ability of the distance measured for the laser range finding device.

BRIEF SUMMARY OF THE INVENTION

An embodiment of the invention provides and discloses a distance measurement method for use in a laser range finding device to measure a distance between the laser range finding device and a target. The distance measurement method comprises the following steps. First, a laser signal to the target is transmitted in a first time point. Then, a reflected laser signal reflected by the target is received. Next, a digital signal having a plurality of signal values is obtained by sampling the reflected laser signal with a sampling signal, wherein the signal values range from 0 to N where N is a positive integer greater than two. A maximum signal value among the signal values of the digital signal is then found. Finally, the distance between the laser range finding device and the target is calculated according to the first time point and a second time point corresponding to the maximum signal value.

An embodiment of the invention also provides and discloses a laser range finding device for measuring a distance between the laser range finding device and a target. The laser range finding device at least comprises a transmitter, a receiver, an analog-to-digital converter and a system unit. The transmitter transmits a laser signal to the target in a first time point. The receiver receives a reflected laser signal reflected by the target. The analog-to-digital converter samples the reflected laser signal with a sampling signal to obtain a digital signal having a plurality of signal values, wherein the signal values range from 0 to N where N is a positive integer greater than two. The system unit finds a maximum signal value among the signal values of the digital signal and calculates the distance between the laser range finding device and the target according to the first time point and a second time point that generates the maximum signal value.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention is now described with reference to FIGS. 1 through 7, which generally relate to a laser range finding devices and distance measurement methods thereof. In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

The embodiments of the invention provide a laser range finding device and distance measurement method thereof so as to obtain a distance between the laser range finding device and a target. In one embodiment, a laser range finding device is provided. The laser range finding device performs a digitalization operation for a received reflected laser signal by an analog-to-digital converter (ADC) so as to generate a digital signal comprising a multitude of signal values. Given the generated digital signal that comprises a multitude of signal values, original waveform and amplitude of the reflected laser signal can be reserved so that the noise signal and the target signal can be distinguished, thus, improving the ability to guard against noise interference, to perform long distance measurements, and to shorten the time for distance measurements.

In an embodiment of a distance method according to the invention, the reflected laser signal is utilized to obtain a digital signal comprising a plurality of signal values, and a maximum signal value among all of the signal values of the digital signal is then found. Next, a time of flight of the laser signal is calculated using the time point which generates the maximum signal value thereby obtaining the distance between the laser range finding device and the target, wherein the time of flight of the laser signal indicates a time difference from a first time point that the laser signal is transmitted to a second time point that a reflected laser signal is received.

Figure 1:
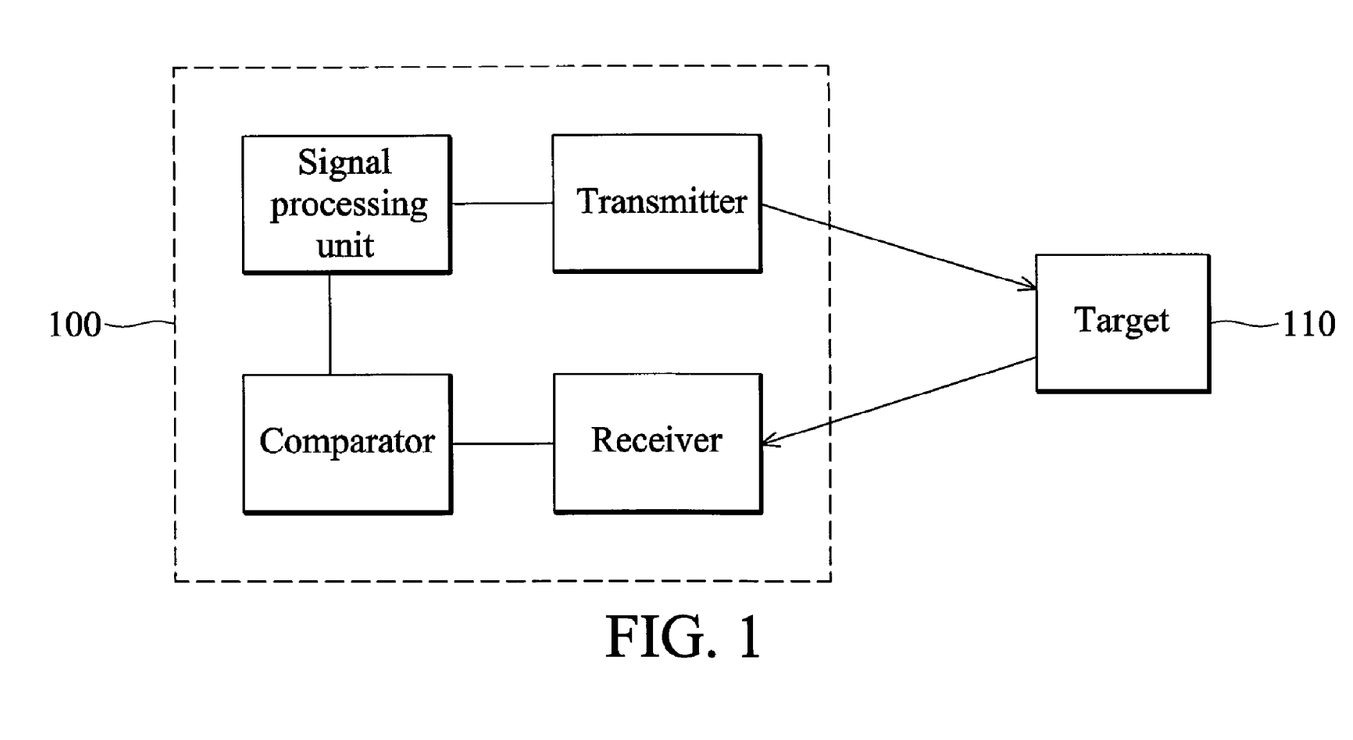
FIG. 1 schematically shows a block diagram of an embodiment of a laser range finding device.

FIG. 1 schematically shows a block diagram of an embodiment of a laser range finding device 100. As shown in FIG. 1, a transmitter in the laser range finding device 100 transmits a laser signal to a target 110 and then a receiver receives the reflected laser signal. The signal values of the reflected laser signal are converted to a value of one or zero by a comparator, processed by a signal processing unit to find out the time point that a target signal is received so as to determine a distance to the target.

The comparator compares the inputted signal value to a threshold level to determine an output value. A value "1" is outputted when the inputted signal value is larger than or equal to the threshold level, otherwise a value "0" is outputted. When the target distance is extended, the signal strength of the reflected laser signal received by the receiver will become relatively weak, resulting in increased interference by noise signals. As a result, for finding the target signal, the threshold level has to be set very small such that noise signals may be erroneously determined as the target signal should the signal value of the noise signal exceed the threshold level. In this case, the target signal may not be actually recognized thereby extending the time needed for distance measurement.

Figure 2:
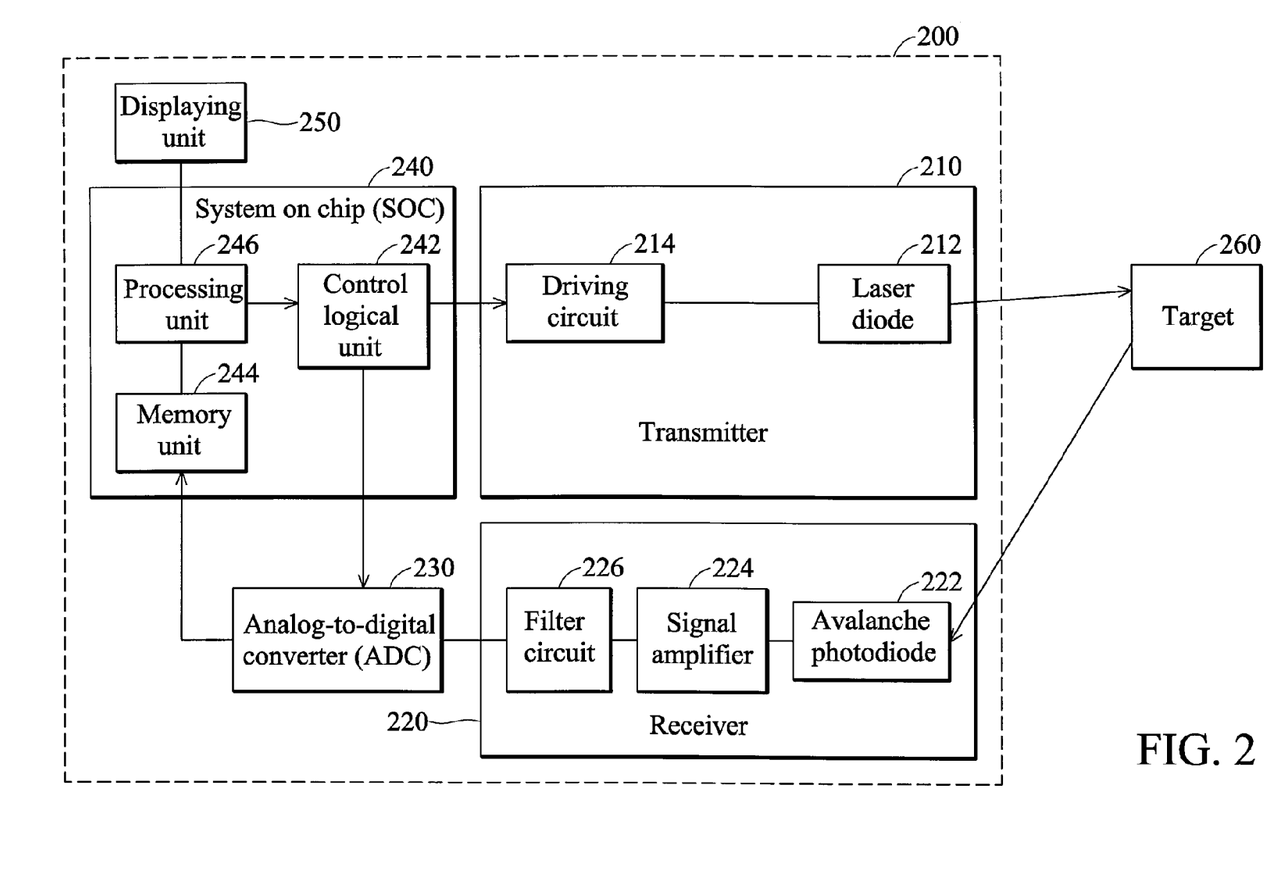
FIG. 2 is a block diagram illustrating an embodiment of a laser range finding device according to the invention.

FIG. 2 is a block diagram illustrating an embodiment of a laser range finding device 200 according to the invention, for measuring the distance therefrom to a target 260. The laser range finding device 200 comprises a transmitter 210, a receiver 220, a analog-to-digital converter (ADC) 230, a system on chip (SOC) 240 and a displaying unit 250. The transmitter 210 transmits a laser signal L1 to the target 260 for measuring the distance. The transmitter 210 further comprises a pulsed laser diode 212 and a driving circuit 240, wherein the driving circuit 240 controls the laser diode 212 to transmit the laser signal to the target 260.

Figure 3:
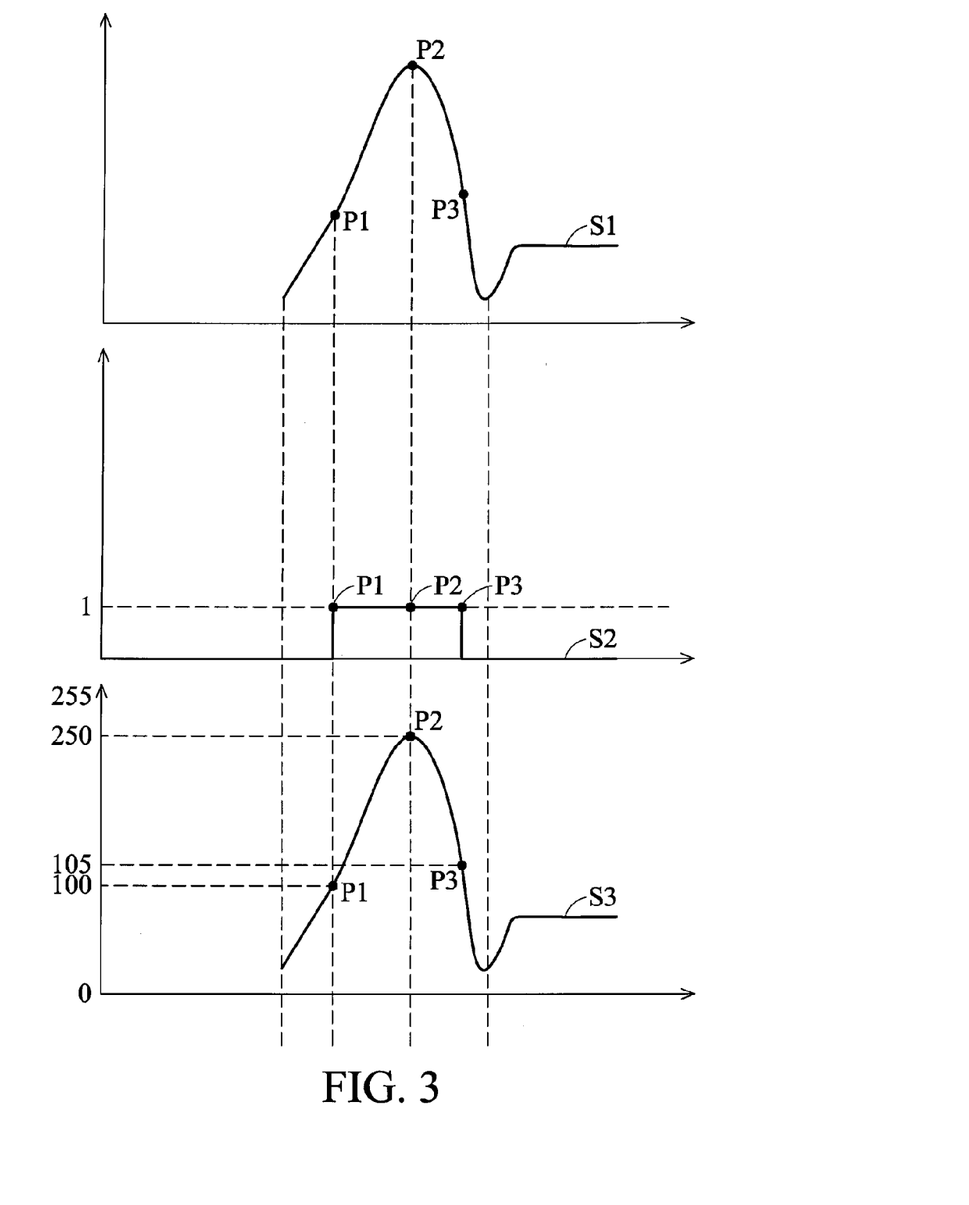
FIG. 3 is a signal waveform diagram.

The receiver 220 receives a reflected laser signal L2 reflected by the target 260, which comprises an avalanche photodiode 222 for receiving the reflected laser signal reflected by the target, a signal amplifier 224 for amplifying the reflected laser signal received by the avalanche photodiode 222, and a filter circuit 226 for performing a noise filtering to the amplified reflected laser signal. The analog-to-digital converter 230 is coupled to the receiver 220, performing a signal digitalization to the reflected laser signal from the receiver 220 so as to obtain a digital signal having a plurality of signal values. It is to be understood that the digital signal has a specific waveform as same as that of the reflected laser signal and all of the signal values range from 0 to N where N is a positive integer greater than two. Referring to FIG. 3, a signal waveform diagram is illustrated. In FIG. 3, signals S1, S2 and S3 represent waveforms of the received reflected laser signal L2, a digital signal that has been digitalized by the comparator of the laser range finding device 100 in FIG. 1, and a digital signal that has been digitalized by the analog-to-digital converter 230 of the laser range finding device 200 in FIG. 2, respectively. It is assumed that, in this embodiment, the analog-to-digital converter 230 is an eight bits analog-to-digital converter (ADC) so that the reflected signal is converted to a digital signal that has a plurality of signal values ranging from 0 to 255. As shown in FIG. 3, signal values of three sampling points P1, P2 and P3 on the reflected laser signal S1 are all converted to "1" on the digital signal S2 while those values of the three sampling points P1, P2 and P3 on the reflected laser signal S1 are respectively converted to "100", "250" and "105" on the digital signal S3. It is observed that the output of the digital signal S2 forming a waveform which is a square wave due to each output of the digital signal S2 is determined by comparing the inputted signal value to a threshold level, not representing that the sampling point P2 has a maximum peak value or a maximum signal value. The signal values of digital signal S3, however, may be quantified as various signal values, not only representing that the sampling point P2 has a maximum peak value or a maximum signal value but also keeping a waveform as same as that of the original signal S1.

The system on chip (SOC) 240 comprises a control logic unit 242, a memory unit 244 and a processing unit 246. The control logic unit 242 is coupled to the processing unit 214, the transmitter 210 and the analog-to-digital converter 230, driving the transmitter 210 to transmit the laser signal to the target 260 and activating the analog-to-digital converter starting signal conversion when it receives a trigger signal from the processing unit 246. The memory unit 244 stores a digital signal converted by the analog-to-digital converter 230. Then, the processing unit 246 reads the stored digital signal from the memory unit 244 and finds a maximum signal value among all of the signal values of the digital signal to calculate a time of flight of the laser signal so as to obtain the distance between the laser range finding device 200 and the target 260.

Figure 4:
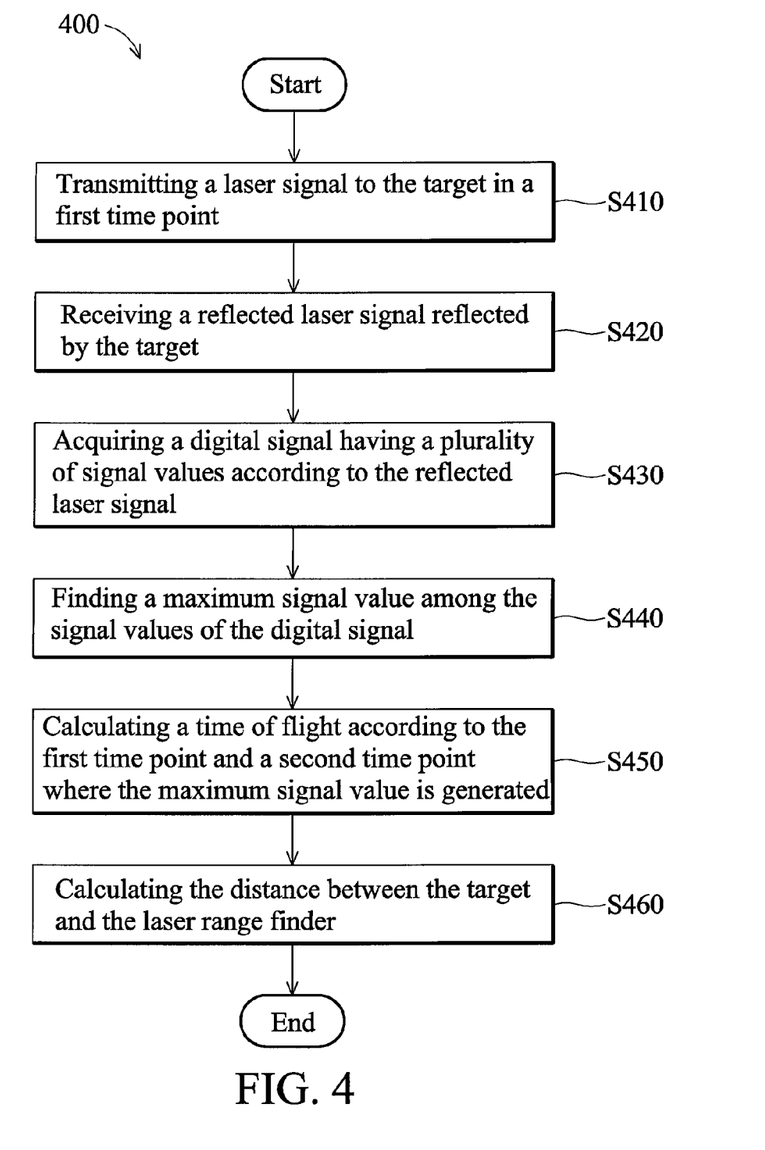
FIG. 4 is a flowchart of an embodiment of a distance measurement method according to the invention.

FIG. 4 is a flowchart 400 of an embodiment of a distance measurement method according to the invention. In this embodiment, refer to both FIGS. 2 and 4. In step S410, a laser signal is transmitted to the target 260 in a first time point T1. The time point T1 is the starting time the laser signal begins transmission. Meanwhile, the control logic unit 244 receives a trigger signal from the processing unit 246 and prepares to perform the distance measurement. Accordingly, during the first time point, the control logic unit 242 drives the driving circuit 214 of the transmitter 210 to control the laser diode 212 to transmit the laser signal L1 to the target 260 and activates the analog-to-digital converter 230 starting signal conversion.

In step S420, a reflected laser signal L2 reflected by the target 260 is then received by the avalanche photodiode 222 of the receiver 220, amplified by the signal amplifier 224, filtered for noise from the amplified reflected laser signal by the filter circuit 226 to achieve a filtered result, and outputted (e.g., signal S1 shown in FIG. 3) to the analog-to-digital converter 230. In step S430, the analog-to-digital converter 230 converts the reflected laser signal from the receiver 220 to a digital signal so as to generate a digital signal having a plurality of signal values.

For example, referring to FIG. 3, assume that the analog-to-digital converter 230 is an eight bits analog-to-digital converter, the reflected laser signal S1 will be converted to the digital signal S3 having a plurality of signal values ranging from 0 to 255, in which the waveform of the digital signal S3 is as same as that of the signal S3. After the digital signal has been generated by the analog-to-digital converter 230, the digital signal is stored in the memory unit 244.

In step S440, the processing unit 246 reads the stored digital signal from the memory unit 244 and finds a maximum signal value among all of the signal values of the digital signal. In step S450, the processing unit 246 calculates a time of flight of the laser signal using the first time point T1 and a second time point T2 that generated the maximum signal value. In this embodiment, the time of flight is defined as the time that the laser signal leaves the laser diode 212 to the time it is received by the analog-to-digital converter 230. In this case, the time of flight T=T2−T1.

In step S460, the distance between the laser range finding device 200 and the target 260 is determined by multiplying the calculated time of flight T by the speed of e light. In this case, the signal values are within a large range (i.e. 0 to N, N>2), depending on the bit number of the used analog-to-digital converter, such that a difference between the noise signal value and the target signal value is larger than one. As a result, the target signal can be easily and actually located and found, shortening the time needed for distance measurement.

For ensuring the accuracy of the maximum signal value time point, in one embodiment, a threshold level is further applied to help determination of the maximum signal value (i.e. target signal).

Figure 5:
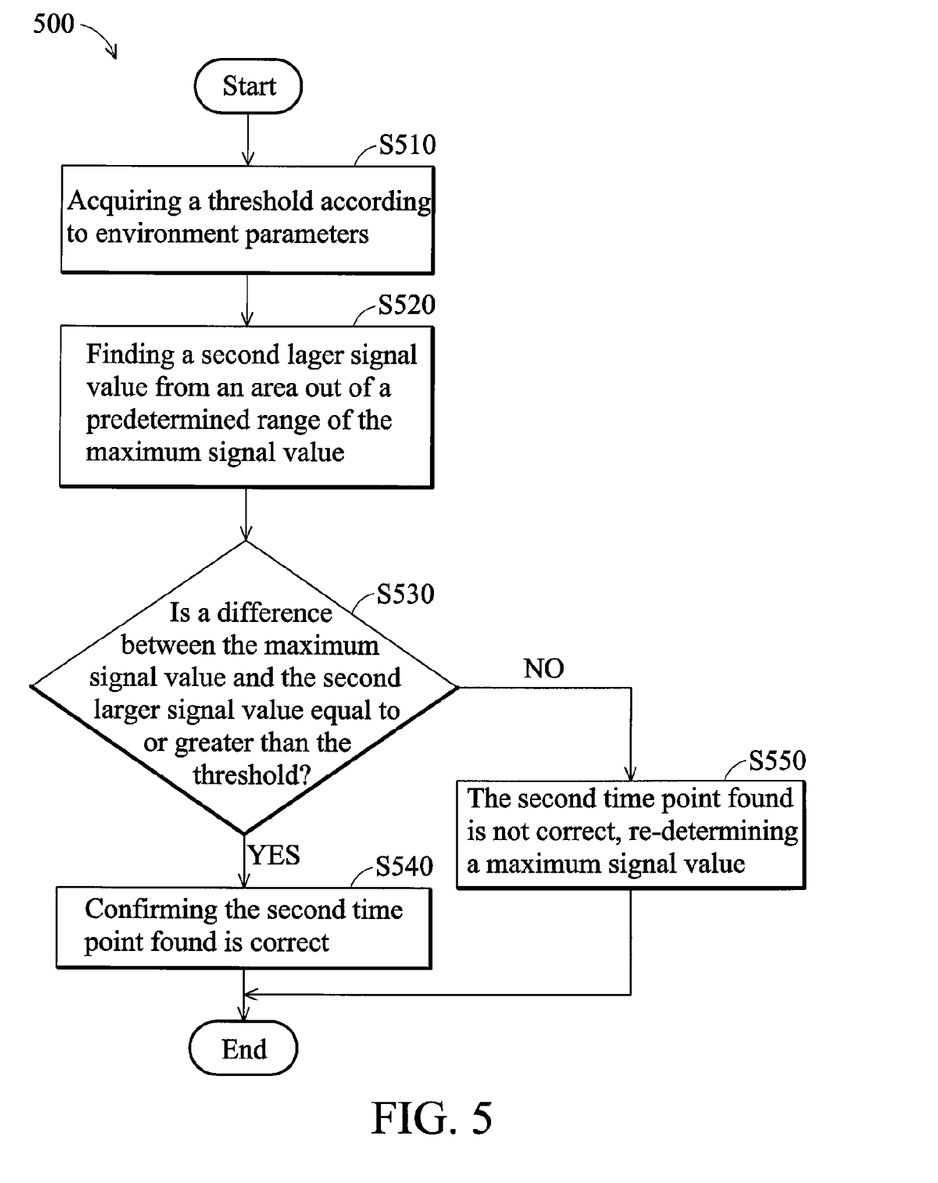
FIG. 5 is a flowchart of another embodiment of a distance measurement method according to the invention.

FIG. 5 is a flowchart 500 of another embodiment of a distance measurement method according to the invention.

As shown in FIG. 5, in step S510, a threshold level corresponding to environmental parameters (such as weather, strength of sun light and noise of the test environment) is obtained. The environmental parameters, such as strength of sun light, can be repeatedly tested in advance to acquire a group of corresponding statistical data to serve as threshold levels later. To acquire the group of statistical data corresponding to the environmental parameters, a number of laser signals are transmitted to the sky and then reflected laser signals are received by the receiver of the laser range finding device as sampled signals. Next, the sampled signals are analyzed to find a relationship of the average signal value AV which is an average value of those sampled signal values and a difference ΔV of the found maximum signal value and a relative maximum signal value found in an area outside of the maximum signal value within a predetermined range. Once the relationship has been found, the threshold level can be set as a value that exceeds a maximum value of the difference ΔV. For example, for the average signal value AV ranging from 18000 to 19000, the measured possible range of the difference ΔV is from 0 to 40, so the threshold level can be set as 42, for example, if the sampled average signal value AV is a value that blows 19000.

Figure 6:
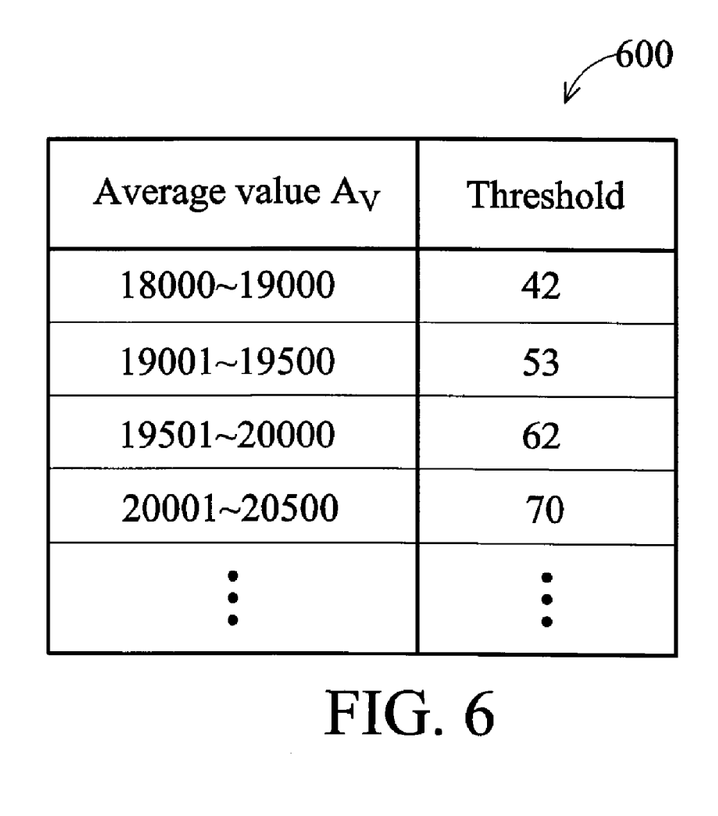
FIG. 6 schematically shows an embodiment of a mapping table according to the invention.

This relationship of the average signal value AV and the corresponding threshold level can be acquired in advance and stored in a mapping table of the memory unit. FIG. 6 schematically shows an embodiment of a mapping table 600 according to the invention. The mapping table 600 has an average value AV field representing the average signal value AV and a threshold level field in which each average value AV field corresponds to a threshold level. For example, by looking up the mapping table, the threshold level is set as 42 if the average value AV is 18500, while the threshold level is set as 62 if the average value AV is 19501.

Accordingly, in step S520, a second larger signal value located in an area outside of the maximum signal value within a predetermined range is found. Note that the predetermined range can be freely adjusted and it is normally a value around the maximum signal value so as to prevent performing erroneous comparisons. For example, in this embodiment, a relative maximum value (i.e. the second larger signal value) is defined as a maximum signal value acquired in an area outside of a time interval that utilizes the second time point as a reference central point and ranged from a time point that is one time unit prior to the second time point to a time point that is one time unit subsequent to the second time point, in which the time unit can be one cycle of the sampling signal of the reflected laser signal. The predetermined range can be defined as, for example, a time interval that utilizes the maximum signal value as a reference central point within three yards, but is not limited thereto.

Figure 7:
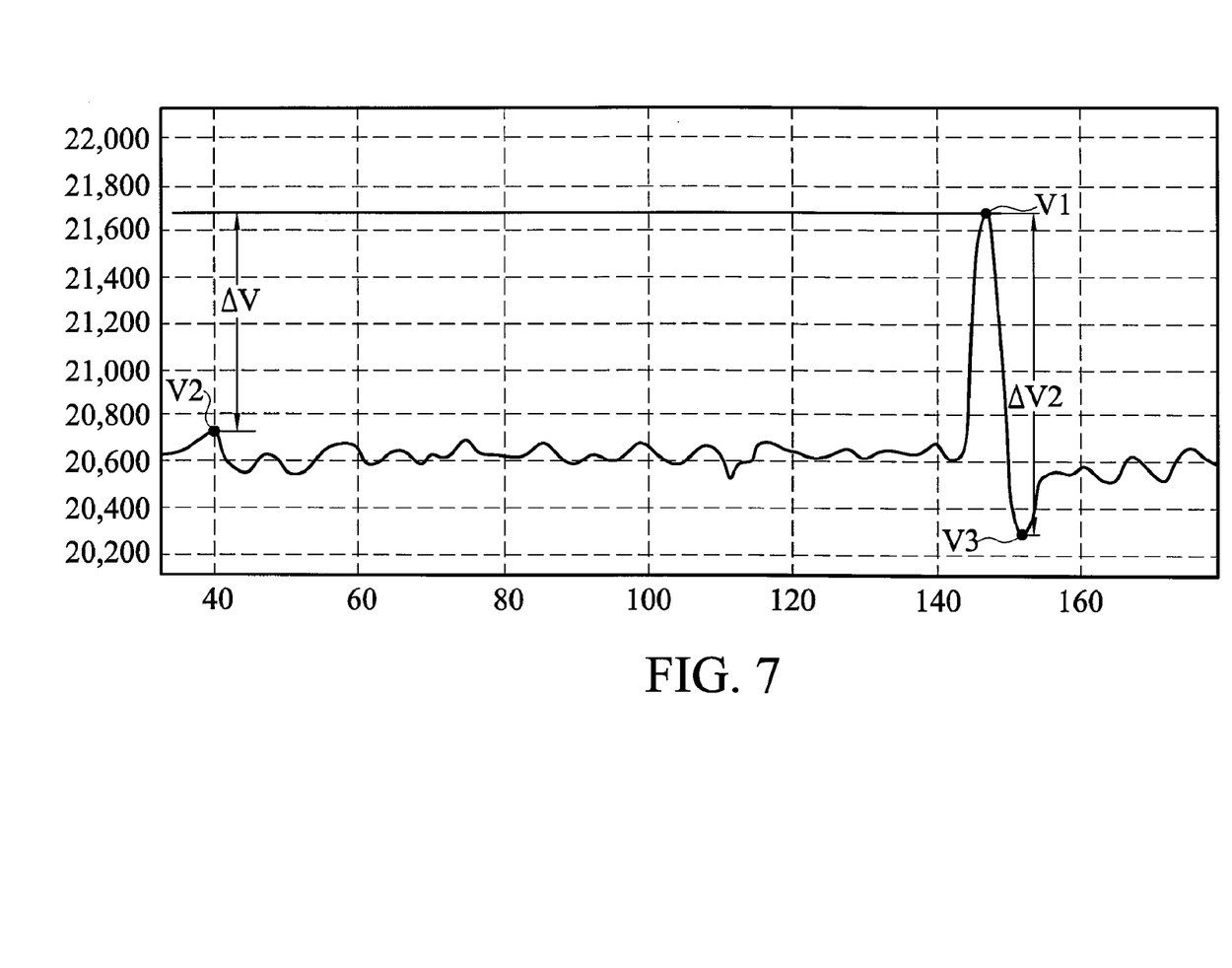
FIG. 7 schematically shows an embodiment of a digital signal according to the invention.

FIG. 7 schematically shows an embodiment of a digital signal according to the invention. As shown in FIG. 7, the signal value at a point V1 is found as the maximum signal value, and a relative maximum signal value (i.e. the signal value at a point V2) is thus, found in an area outside of the signal value of the point V1 within a predetermined range.

Next, in step S530, it is determined that whether a difference ΔV (i.e. V1−V2) between the maximum signal value and the relative maximum signal value is not less than a selected threshold level. If so (Yes in step S530), the found maximum signal value is determined as the target signal thereby the second time point that the maximum signal value has occurred is recognized as being correct (step S540). If not (No in step S530), it implies that the found maximum signal value may be a noise signal, therefore, the laser signal is re-transmitted to perform another measurement (step S550).

In addition, referring to FIG. 7, a maximum value would be found after the time point that the maximum signal value has occurred (as the signal value at time point T3 shown in FIG. 7) due to the property of the hardware devices (such as the analog filter). Such property of the hardware devices, therefore, may be used to help determination of the target signal.

In one embodiment, a relative minimum signal value can be acquired after the maximum signal value has occurred, and then it is determined that whether a difference ΔV2 (i.e. V1−V3) between the maximum signal value and the relative minimum signal value is not less than a second threshold level. If so, the found maximum signal value is determined as the target signal thereby the second time point that the maximum signal value has occurred is recognized as being correct. If not, it implies that the found maximum signal value may be a noise signal, therefore, the laser signal is re-transmitted to perform another measurement. In another embodiment, when the difference ΔV between the maximum signal value and the second larger signal value (the relative maximum signal value) is less than the selected threshold level (No in step S530), it is further determined that whether the difference ΔV2 (i.e. V1−V3) between the maximum signal value and the relative minimum signal value is not less than a second threshold level. If so, the found maximum signal value is determined as the target signal and thereby the second time point that the maximum signal value has occurred is recognized as being correct. If not, it implies that the found maximum signal value may be a noise signal, therefore, the laser signal is re-transmitted to perform another measurement.

It is to be noted that, as would be apparent to those skilled in the art, the although only one set of laser signals are illustrated, it is also possible to transmit a number of sets of laser signals for distance measurement. In this case, the receiver is capable of receiving a number of reflected laser signals corresponding to the transmitted ones and accumulating or averaging these received reflected laser signals so as to perform further processes using the accumulated or averaged signals. The invention is therefore capable of application in distance measurement for a plurality of sets of laser signals.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A distance measurement method for use in a laser range finding device to measure a distance between the laser range finding device and a target, comprising:
    transmitting a laser signal to the target in a first time point;
    receiving a reflected laser signal reflected by the target;
    obtaining a digital signal having a plurality of signal values by sampling the reflected laser signal with a sampling signal, wherein the signal values range from 0 to N where N is a positive integer greater than two;
    finding a maximum signal value among the signal values of the digital signal;
    calculating the distance between the laser range finding device and the target according to the first time point and a second time point corresponding to the maximum signal value;
    identifying a first signal value from the signal values by a specific rule;
    determining whether a difference of the maximum signal value and the first signal value is not less than a first threshold level;
    if so, determining that the maximum signal value is a target signal; and
    determining that the found maximum signal value is a noise signal when the difference of the maximum signal value and the first signal value is less than the first threshold level.

2. The distance measurement method of claim 1, wherein the specific rule is defined as defining a relative maximum value from signal values out of a predetermined time period as the first signal value.

3. The distance measurement method of claim 2, wherein the predetermined time period is two times of one cycle of the sampling signal using the second time point as a reference central point.

4. The distance measurement method of claim 1, wherein the first threshold level is a built-in the laser range finding device based on environment parameters.

5. The distance measurement method of claim 1, further comprising:
    obtaining a relative minimum signal value from the signal values after the second time point when the difference of the maximum signal value and the first signal value is less than the first threshold level;
    determining whether a difference of the maximum signal value and the relative minimum signal value is not less than a second threshold level; and
    if so, determining that the found maximum signal value is a target signal.

6. The distance measurement method of claim 1, further comprising:
    obtaining a relative minimum signal value from the signal values after the second time point when the difference of the maximum signal value and the first signal value is less than the first threshold level;
    determining whether a difference of the maximum signal value and the relative minimum signal value is not less than a second threshold level; and
    if so, determining that the found maximum signal value is a target signal.

7. The distance measurement method of claim 1, wherein the digital signal is a signal with eight bits.

8. A laser range finding device for measuring a distance between the laser range finding device and a target, at least comprising:
    a transmitter, transmitting a laser signal to the target in a first time point;
    a receiver, receiving a reflected laser signal reflected by the target;
    an analog-to-digital converter, sampling the reflected laser signal with a sampling signal to obtain a digital signal having a plurality of signal values, wherein the signal values range from 0 to N where N is a positive integer greater than two; and
    a system unit, finding a maximum signal value among the signal values of the digital signal and calculating the distance between the laser range finding device and the target according to the first time point and a second time point that generates the maximum signal value, wherein the system unit further comprises:
        a memory unit, storing the digital signal;
        a processing unit, reading the digital signal from the memory unit and finding the maximum signal value among the signal values of the digital signal; and
        a control logic unit, receiving a trigger signal from the processing unit so as to drive the transmitter to transmit the laser signal and activate the analog-to-digital converter, and
    wherein the system unit identifies a first signal value from the signal values by a specific rule, and determines whether a difference of the maximum signal value and the first signal value is not less than a first threshold level, and if so, determines that the maximum signal value is a target signal and determines that the found maximum signal value is a noise signal when the difference of the maximum signal value and the first signal value is less than the first threshold level.

9. The laser range finding device of claim 8, wherein the transmitter further comprises:
    a laser diode; and
    a driving circuit, controlling the laser diode to transmit the laser signal to the target.

10. The laser range finding device of claim 9, wherein the receiver further comprises:
    an avalanche photodiode, receiving the reflected laser signal reflected by the target;
    a signal amplifier, amplifying the reflected laser signal received by the avalanche photodiode; and
    a filter circuit, for performing a noise filtering to the amplified reflected laser signal.

11. The laser range finding device of claim 8, further comprising a display unit coupled to the processing unit for displaying the distance between the laser range finding device and the target calculated by the processing unit.

12. The laser range finding device of claim 8, wherein the processing unit further drives the transmitter to transmit another laser signal to the target for repeatedly measuring the distance between the laser range finding device and the target after the found maximum signal value is determined as the noise signal.

13. The laser range finding device of claim 8, wherein the specific rule is defined as defining a relative maximum value from signal values out of a predetermined time period as the first signal value.

14. The laser range finding device of claim 13, wherein the predetermined time period is two times of one cycle of the sampling signal using the second time point as a reference central point.

15. The laser range finding device of claim 8, wherein the first threshold level is pre-stored in the memory unit.

16. The laser range finding device of claim 15, wherein the first threshold level is defined as an average value of signal values of the signals generated by the repeated measuring process of the distance between the laser range finding device and the target.

* * * * *